Sept. 4, 1951     H. A. BRASSERT ET AL     2,567,007
BLAST FURNACE
Filed Dec. 1, 1949
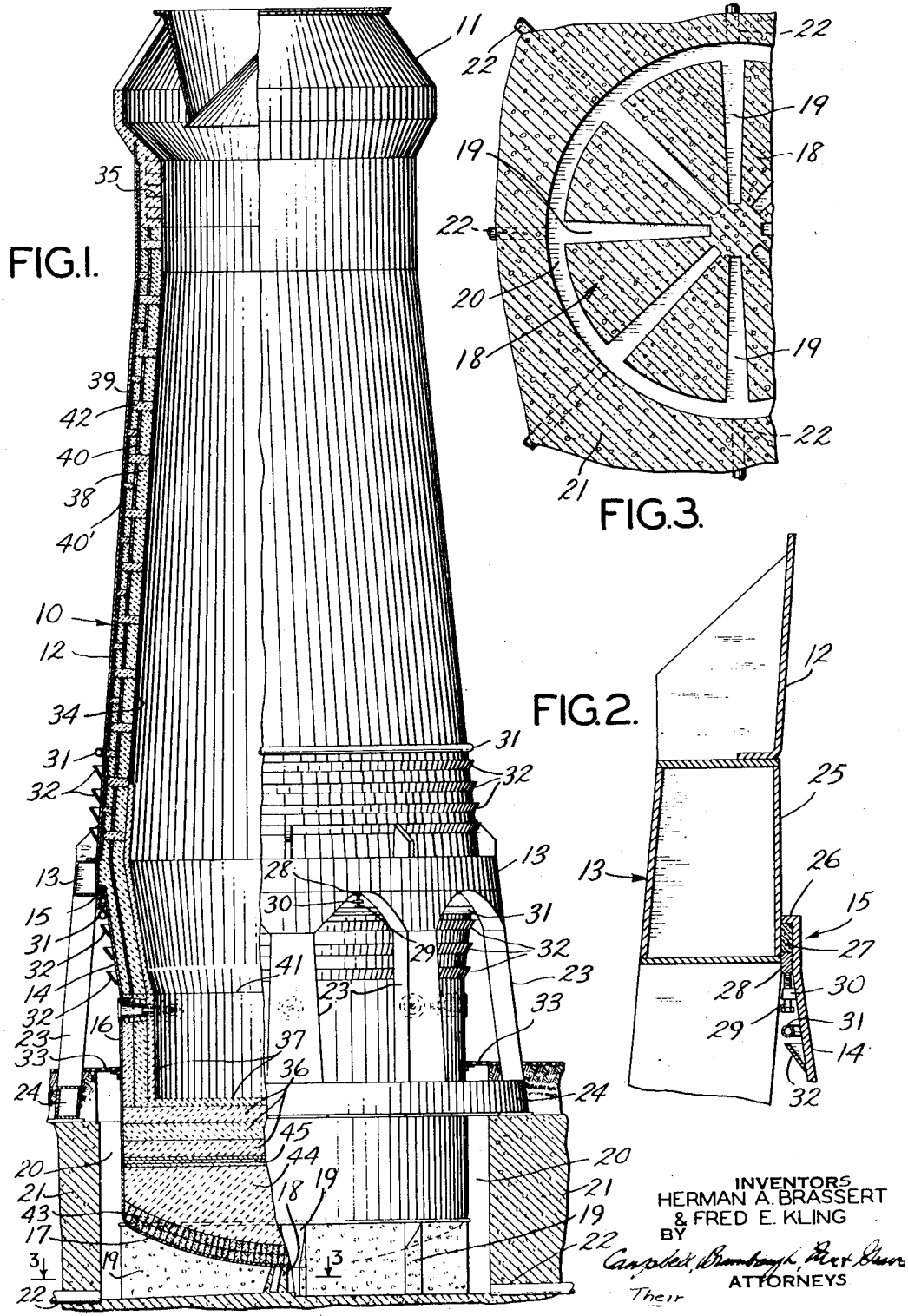
INVENTORS
HERMAN A. BRASSERT
& FRED E. KLING
BY
Their ATTORNEYS Patented Sept. 4, 1951

2,567,007

UNITED STATES PATENT OFFICE 2,567,007

BLAST FURNACE

Herman A. Brassert, Washington, Conn., and Fred E. Kling, Brooklyn, N. Y., assignors to H. A. Brassert & Company, New York, N. Y., a corporation of Illinois Application December 1, 1949, Serial No. 130,538

10 Claims. (Cl. 266—25)

This invention relates to shaft furnaces, and has particular reference to a gas-tight structure for blast furnaces.

The shaft of a conventional blast furnace usually comprises a horizontal mantle located approximately at the level of the top of the furance bosh and composed of a series of steel plates joined to form a horizontal ring supported on columns which rest on a concrete foundation, this mantle carrying the upwardly extending steel shell and the in-wall and upper shaft fire brick lining of the furnace. The bosh and hearth linings, on the other hand, are supported on the concrete foundation and extend upwardly to the mantle. The bosh lining is held in place by spaced bands with horizontal cooling plates between them. The hearth lining is surrounded by a heavy steel plate jacket, water-cooled by various means. Neither the juncture of the structure at the mantle between the bosh and the stack in-wall nor the banded bosh are gas-tight, and the thermal expansion and contraction due to varying temperatures between the interior and exterior of the furnace, as well as the vibrations due to slips of the burden after hanging, tend to cause the bosh lining to leak and to crack, allowing gas leakage through the brickwork.

With modern practice of increased blast furnace size and blast and gas pressure, the conventional blast furnace structure is no longer adequate and inasmuch as gas losses and consequent danger to human life increase with increase in operating pressures, there is considerable need for a stronger and gas-tight structure. Also, with the advent of carbon linings, it has become of the utmost importance to protect the carbon against infiltration of moisture and air which rapidly destroy the lining.

In accordance with the present invention, a shaft construction for blast furnaces and the like is provided in which the entire shell of the furnace virtually comprises a unitary welded tank, the only exception being a gas-tight expansion joint at the mantle in the form of a stuffing box or other suitable means, whereby a strong, gas, air and moisture-tight structure is afforded which can withstand any practicable internal gas pressures and vibrations and shocks occurring during operation.

More particularly, the furnace structure of this invention comprises an upwardly tapering unitary welded steel shell supported on the foundation by a columnar structure extending downwardly from the mantle as a linear extension of the shell. The steel bosh and hearth jackets are welded together as a unit, and the bottom of the hearth jacket is closed by a steel plate forming a cup-shaped steel enclosure for the hearth and bosh, which rests directly on the foundation. The cylindrical upper edge of this combination bosh and hearth jacket is telescoped within the cylindrical lower end of the shell and the resulting slip joint between them is sealed with asbestos packing, so that the entire steel casing of the furnace is a gas-tight tank and is imperforate except for the open top and the tuyère, cinder and iron notch openings.

The furnace lining within this unitary steel tube or tank is composed of a carbon block inwall between which and the shell may be interposed an intermediate liner or back wall of refractory or insulating brick which is separated from the carbon block in-wall by a thin layer of packed granular carbon, or the carbon lining may bear directly against the shell and the refractory back wall is preferably spaced from the steel shell by a thin layer of packed granular refractory material. If the carbon block in-wall is enclosed by a firebrick or insulating back lining, then it should extend into the refractory back wall at spaced intervals so as to be, in effect, keyed into the refractory liner throughout the entire extent of the shell above the mantle. The carbon block wall of the bosh and of the hearth may be inner-lined with refractory material in the usual way.

It will be seen that with this arrangement, the unitary, one-piece welded steel shell, which carries the furnace top with its charging equipment, is supported independently of the lining and thermal expansion and contraction are accommodated upwardly of the mantle by reason of the expansion joint. The entire furnace is gas-tight against leakage, is strong though semi-rigid and enables the furnace to be operated under substantial superatmospheric pressures. The lining, being supported virtually independently of the steel tube or tank, may slip to a slight degree relatively thereto as may be necessary to accommodate the differential thermal expansion between the steel casing and the lining, although such differential thermal expansion can be minimized by the use of carbon block which has a thermal coefficient of expansion approximately one-half that of the usual fire clay lining materials and also has much greater crushing strength, and therefore, the in-wall may be made thinner than heretofore, and cracking of the walls at the mantle is eliminated. Such differential expansion as occurs between the lining and the steel casing is accommodated at the top of the furnace.

For a more complete understanding of the invention, reference may be had to the accompanying drawings, in which:

Figure 1 is an axial section through a blast furnace shaft embodying the present invention;

Fig. 2 is an enlarged detail of the mantle ring structure and stuffing box; and

Fig. 3 is a plan view of the hearth and bosh formation platform as seen along the line 3—3 of Fig. 1.

Referring to the drawings, numeral 10 generally designates a steel casing for the entire blast furnace and is made of heavy welded steel plate construction, preferably of progressively decreasing thickness from the hearth to the top 11. The elements of the steel casing 10 comprise the shell 12 which tapers slightly upwardly from the external mantle ring 13, from which depends the bosh jacket 14 slidably connected to the wall 25 by a gas-tight stuffing box 15 and having the hearth jacket 16 welded thereto. The hearth jacket 16 is extended downwardly and terminates in a convex bottom 17 supported on a concrete platform 18 cast with a concave seat to conform to the convex bottom 17 and provided with radial slots or flues 19 communicating with the annular space 20 within the foundation 21, as shown in Fig. 3. Space 20 is provided with drain pipes 22 for a purpose to be described.

Instead of being convex, the furnace bottom 17 may be flat or have another desired curvature, although the convex shape is preferred, and the contour of the upper surface of the platform 18 conformed thereto. By reason of the integral bottom 17 of the described shape, the bosh and hearth jackets have the form of a cup and the entire furnace casing 10 is essentially a sealed steel tank, open only at the top, except for the tuyère and iron and cinder notch openings.

Flaring slightly downwardly at substantially the slope of the shell 12 are spaced columns 23 forming part of the unitary welded construction comprising the mantle ring 13, the columns 23 and the base ring 24 which is mounted on the concrete foundation 21. As shown in Fig. 1, the mantle ring 13 and column unit 13, 23 and 24 constitute, in effect, a downward linear extension of the shell 12 and within which the respective bosh and hearth jackets 14 and 16 are positioned in the manner described. Details of construction of the columns 23 and base ring 24 form no part of the present invention, and preferably follow the box girder-like construction disclosed in copending application Serial No. 759,565, filed July 8, 1947, by Fred E. Kling.

Referring to the enlarged section of Fig. 2, the shell 12 is supported on and welded to the hollow box section mantle ring 13, the interior wall 25 of which is cylindrical and into which the lateral flange 26 in the upper edge of the bosh jacket 14 telescopes with a sliding fit. The annular space between the cylindrical wall 25 of the mantle ring 13 and the outer surface of the bosh jacket 14 is filled with asbestos packing 27 placed under pressure by the packing ring or gland 28 urged upwardly against it by screw bolts or studs 29 threaded through lugs 30 welded at spaced points around the outer surface of bosh jacket 14. The parts 25 to 30, together with the cooperating surface of the bosh jacket 14 accordingly constitute the stuffing box 15 sealing the expansion joint between the bosh jacket 14 and shell 12 against gas leakage.

The mantle and bosh may be externally cooled by water sprays issuing from perforated circular spray pipes 31 and a series of overflow troughs 32 encircling the furnace in a known manner. This external water cooling system may extend as high up on the shell 12 as required. The overflow from the lowermost trough 32 flows down the outer surface of the steel bosh and hearth cup 14, 16, 17 to cool the same and the water drains out through flues 19, space 20 and pipes 22. Cooling of the bosh and hearth cup 14, 16 and 17 is aided by air cooling, the hot air rising through flues 19 and space 20 through the grid plates 33.

The in-wall lining 34 of the furnace from the metal armor 35 above the stock line down to the hearth bottom 36 is preferably formed of carbon block or carbon brick laid up to a uniform wall thickness on the order of one foot. Also, the hearth bottom 36 is preferably formed of carbon block layers on the order of four feet thick.

Not only is carbon brick of lower thermal expansion than fire clay brick, but it also is lighter in weight so that the lining described is thinner, and hence avoids the necessity of supporting the upper part of it on a mantle. Also, the compressive strength of carbon brick or block ranges from about 3600 to about 7200 pounds per square inch, whereas that of fire brick is only about 1200 to about 5000 pounds per square inch, varying in accordance with the fire clay used and the methods of manufacturing the brick. Also, the strength of carbon remains about the same with increased temperature above 3000° F., while fire clay brick weakens with increasing temperature and its strength is relatively low at the temperatures normally existing in the hearth and bosh walls. Carbon does not melt at high temperatures as does brick. In fact, it is stable up to temperatures above 6000° F., and even there it does not melt, but slowly vaporizes or sublimes.

Carbon is also very resistant to erosion, so that a thinner lining will last as long as a thicker lining of fire brick. The expansion coefficients of carbon and graphite are only a little more than half of those of fire clay refractories, in fact, if the blocks are not properly made, they are liable to shrink after extended exposure to heat, and therefore, the problem of expansion of the lining, if any, is substantially reduced and can be taken care of at the top of the lining.

The carbon lining hearth bottom 36 and the hearth and bosh is over-laid with a high flint clay brick inner lining 37 for initial protection in the usual way.

The carbon block in-wall 38 may bear directly against the shell or there may be interposed between the carbon in-wall 38 and the steel casing 10, a refractory back wall 39 of fire clay brick of a thickness on the order of nine inches as shown in Fig. 1. However, in that case, this back wall 39 is separated from the carbon in-wall 38 by a three inch layer 40 of hard-rammed carbon granules from the top armor 37 down to the hearth, whose upper edge is generally defined by the top line 41. Preferably, the refractory back wall 39 is interrupted at spaced intervals, say about four feet, by a ring or course of carbon block or brick 42 extending through the packing 40 to the casing 10, thus keying the carbon in-wall 38 and the fire brick back wall 39 together. A thin layer 40' of packed fire brick granules may be interposed between the back wall 39 and shell 12.

The lining of the furnace including the bosh is supported in part by the conical bosh jacket 14 and in part by the hearth bottom 36, between which and the steel bottom plate 17 is the insulating hearth base composed of key refractory brick 43 overlaid with packed fire clay 44 and then several layers 45 of rammed refractory material.

In operation of the furnace of this invention the differential thermal expansion and contraction between the bosh jacket 14 and the shell 13 is allowed by the stuffing box 15 without leakage, and as this expansion mainly occurs upwardly of the mantle, the slight projection of the flange 26 into the brick work does not interfere with such expansion or contraction. Likewise, since the lining is supported virtually independently of the steel work, its thermal expansion and contraction relatively to the latter is likewise independent thereof, although as stated, the water-cooling of the steel casing and the use of carbon block lining minimizes relative expansion between the lining and casing. The water and air cooling of the casing 10 is carried down to the bottom 17 by reason of the freedom of the water to flow downwardly thereto and thereover and the air flues 19 and annular space 20 permit free air circulation. Thus, the light and strong furnace shaft of this invention is efficiently cooled, and may be operated under substantial pressure.

Although a preferred embodiment of the invention has been illustrated and described herein, it is to be understood that the invention is not limited thereby except within the scope of the appended claims.

We claim:

1. In a gas-tight shaft furnace, the combination of an upwardly-tapering unitary, unperforate tubular metal shell, a columnar support for said shell constituting a substantially linear downward extension thereof, a metallic bosh jacket and a metallic hearth jacket secured integrally together, a base member supporting said jackets, a gas tight stuffing box between said shell and bosh jacket permitting relative movement between them, a bottom plate secured integrally to said hearth jacket to close the lower end thereof, a refractory lining for said shell and bosh and hearth jackets, and means for spraying cooling liquid on said shell and jackets to cool them.

2. In a gas-tight shaft furnace, the combination of an upwardly-tapering unitary tubular metal shell, a columnar support for said shell constituting a substantially linear downward extension thereof, a bosh jacket, the lower edge of said shell overlapping said bosh jacket, a gas-tight packing interposed between the overlapping shell and bosh jacket, a hearth jacket secured integrally to said bosh jacket, a bottom plate secured integrally to said hearth jacket to close the lower end thereof, and a refractory lining for said shell and bosh and hearth jackets.

3. In a gas-tight shaft furnace, the combination of an upwardly-tapering unitary tubular metal shell, said shell having a cylindrical lower edge portion, a columnar support for said shell constituting a substantially linear downward extension thereof, a bosh and hearth jacket telescoped within the cylindrical portion of said shell, a gas-tight packing interposed between the telescoping portions of said shell and jacket, and a refractory lining for said shell and jacket.

4. In a gas-tight shaft furnace, the combination of an upwardly-tapering unitary tubular metal shell, said shell having a cylindrical lower edge portion, a columnar support for said shell constituting a substantially linear downward extension thereof, a bosh and hearth jacket telescoped within the cylindrical portion of said shell, a gas-tight packing interposed between the telescoping portions of said shell and jacket, a bottom plate secured integrally to said hearth jacket to close the lower end thereof, and a refractory lining for said shell and jacket.

5. In a gas-tight shaft furnace, the combination of a tubular metal casing supported on a suitable foundation and comprising a mantle ring and a shell tapering upwardly from the mantle ring, a columnar support for said shell and mantle ring and constituting a substantially linear downward extension of said shell from the mantle ring to said foundation, a bosh and hearth jacket connected to the shell, a bottom plate secured integrally to said jacket to close the lower end thereof, a platform on said foundation supporting said bottom plate, said platform defining flues leading from beneath said plate to the atmosphere, and a refractory lining for said shell and jacket.

6. In a gas-tight shaft furnace, the combination of a mantle ring, a tubular metal shell tapering upwardly from the mantle ring, a foundation, a columnar support for said shell and mantle ring and constituting a substantially linear downward extension of said shell from the mantle ring to said foundation, a bosh and hearth jacket connected to the shell, a gas-tight packing in said connection, a bottom plate secured integrally to said jacket to close the lower end thereof, a platform on said foundation supporting said bottom plate, said platform defining flues leading from beneath said plate to the atmosphere, and a refractory lining for said shell and jacket.

7. In a gas-tight shaft furnace, the combination of a tubular metal casing supported on a suitable foundation and comprising a mantle ring and a shell tapering upwardly from the mantle ring, a columnar support for said shell and mantle ring and constituting a substantially linear downward extension of said shell from the mantle ring to said foundation, a bosh and hearth jacket connected to the shell, and extending downwardly into a recess within said foundation affording an annular space around said jacket, a bottom plate secured integrally to said jacket to close the lower end thereof, a platform within the recess in said foundation supporting said bottom plate, said platform defining flues leading from beneath said plate to the annular space, and a refractory lining for said shell and jacket.

8. In a gas-tight shaft furnace, the combination of a tubular metal casing supported on a suitable foundation and comprising a mantle ring and a shell tapering upwardly from the mantle ring, a columnar support for said casing constituting a substantially linear downward extension thereof from the mantle ring to said foundation, a bosh and hearth jacket extending upwardly into the casing, a flange on the upper edge of said jacket slidingly engaging the inner surface of said casing, and forming an annular space between said jacket and said casing, non-metallic packing in the annular space between the flange casing and jacket, a packing gland engaging said packing, means urging said gland against said packing to gas-tightly seal the joint between said casing and jacket, and a refractory lining within said casing and jacket.

9. In a gas-tight shaft furnace, the combination of a tubular metal casing supported on a suitable foundation and comprising a mantle ring and a shell tapering upwardly from the mantle ring, a columnar support for said casing constituting a substantially linear downward extension thereof from the mantle ring to said foundation, a bosh and hearth jacket, a joint between said jacket and said casing, a stuffing box sealing the joint between said casing and jacket, an in-wall lining for said casing and jacket comprising a layer of substantially low thermal expansion refractory material, a back wall layer of substantially high thermal expansion refractory material spaced from said in-wall layer, and a packing of granular refractory material in the space between said layers.

10. In a gas-tight shaft furnace, the combination of a tubular metal casing supported on a suitable foundation and comprising a mantle ring and a shell tapering upwardy from the mantle ring, a columnar support for said casing constituting a substantially linear downward extension thereof from the mantle ring to said foundation, a bosh and hearth jacket, a joint between said jacket and said casing, a stuffing box sealing the joint between said casing and jacket, an in-wall lining for said casing and jacket comprising a layer of substantially low thermal expansion refractory material, a back wall layer of substantially high thermal expansion refractory material spaced from said in-wall layer, a packing of granular refractory material in the space between said layers, and lateral extensions at vertically-spaced points on the outer surface of said in-wall layer interrupting said packing and inserted in said back-wall layer.

HERMAN A. BRASSERT.
FRED E. KLING.

REFERENCES CITED

The following references are of record in the file of this patent:

UNITED STATES PATENTS

| Number | Name | Date |
| --- | --- | --- |
| 900,291 | Meissner | Oct. 6, 1908 |
| 1,171,719 | Harrison | Feb. 15, 1916 |
| 1,435,610 | Koch | Nov. 14, 1922 |
| 2,472,612 | Poland | June 7, 1949 |

OTHER REFERENCES

"Earthquake-Proof Blast Furnace Structure," Iron and Steel Engineer, March 1949, page 110.